F. MESINGER.
DRIVE CHAIN.
APPLICATION FILED MAR. 9, 1917.

1,236,964.

Patented Aug. 14, 1917.

Frederick Mesinger, Inventor

By his Attorney

UNITED STATES PATENT OFFICE.

FREDERICK MESINGER, OF NEW YORK, N. Y.

DRIVE-CHAIN.

1,236,964. Specification of Letters Patent. Patented Aug. 14, 1917.

Application filed March 9, 1917. Serial No. 153,554.

*To all whom it may concern:*

Be it known that I, FREDERICK MESINGER, a citizen of the United States, and a resident of New York city, in the borough of Bronx and State of New York, have invented certain new and useful Improvements in Drive-Chains, of which the following is a specification.

This invention relates to a drive chain which is designed more particularly to transmit motion by means of pulleys engaged by the chain links. The invention comprises a novel construction of the chain by means of which its strength and efficiency is materially augmented, and also a novel method of forming the outer or operative chain links that come into direct engagement with the pulleys.

In the accompanying drawing:—

Figure 1:
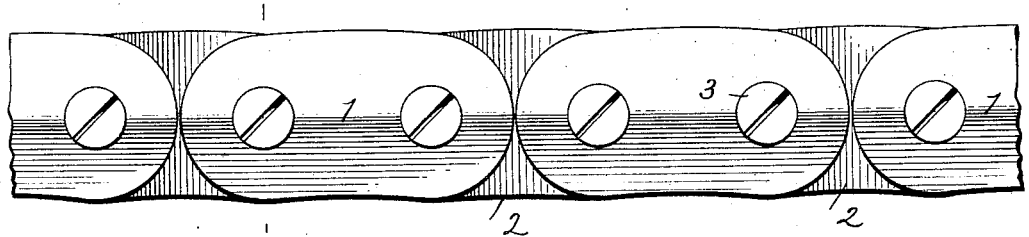
Figure 2:
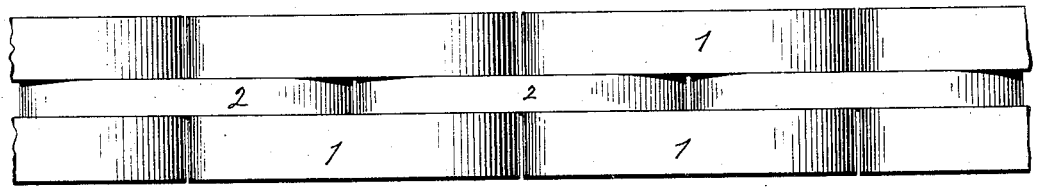
Figure 3:
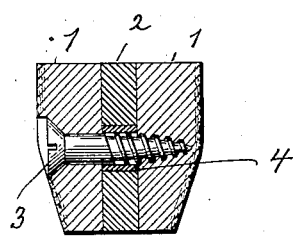
Figure 4:
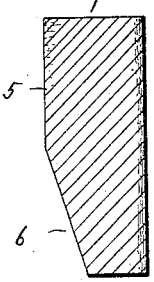
Figure 5:
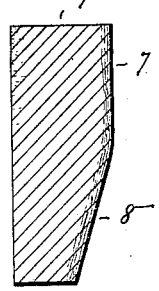

Figure 1 is a side elevation of a drive chain embodying my invention;

Fig. 2, a top view;

Fig. 3, a section on line 3—3 Fig. 1;

Fig. 4, an enlarged cross section of one of the chain link blanks before being bent, and Fig. 5, a similar cross section of the link completed.

The chain is composed of outer links 1, formed of sole or belting leather, and of inner links 2 preferably formed of rawhide or fiber. The outer links 1 are arranged in pairs, while the inner links project with their ends between the outer links to which they are pivotally connected by screws 3. Each screw is countersunk in one of the outer links, passes through an aperture of the inner link and is then threaded into the companion outer link, the aperture in the inner link being reinforced by a metal bushing 4. By the construction described, each pair of outer links will be furnished with two screw pivots by means of which it is connected to the adjoining ends of a pair of inner links.

The chain which is the subject matter of this invention is intended to transmit motion by means of grooved pulleys or wheels having beveled flanges that engage the outer sides of the outer links 1. In order to insure a proper engagement between chain links and pulleys it is necessary that the outer faces of links 1 be furnished with a beveled section that parallels substantially the bevel of the pulley flanges. As already stated, I form the outer links from what is known as sole or belting leather, such leather having an outer or grain side (being the side from which the hair has been removed) and an inner or flesh side, the former being much stronger and denser than the latter. In assembling the parts, links 1 are so arranged that their grain side faces outwardly or toward the pulley-flanges, while their flesh side faces inwardly or toward links 2, and consequently the grain side of the links must be furnished with the bevel hereinbefore referred to as paralleling the pulley flange bevel. I provide for this bevel, without cutting away any portion of the grain side of the link, so that the latter remains intact or continuous throughout the entire outer or operative face of the link.

In order to obtain this desirable result, I proceed as follows: After the link blank has been stamped from the leather, I chamfer it on its flesh side so as to remove therefrom along one of its longitudinal edges, a small strip which is triangular in cross section. Thus, said inner side will be provided with a straight section 5 and with a beveled section 6, the beveled section joining the straight section at an obtuse angle (Fig. 4) while furthermore, the dip of the beveled section should correspond substantially to the bevel of the pulley flange, with which the chain is to coöperate. The blank thus prepared is by means of proper dies so bent sidewise that the beveled section 6 will be brought into substantial alinement with the straight section 5, or in other words that the obtuse angle is changed into an angle of 180°. By this operation, there will be formed on the grain side of the link, a straight section 7, and beveled section 8, the dip of the latter, corresponding to the dip of the obliterated beveled section 6, but extending of course, in a direction opposite thereto. Thus the finished link will have an outer side which is partly straight and partly beveled, in cross section, while the inner side is entirely straight in cross section. The result is, that each link will be composed of an outer portion with parallel outer and inner sides, and of an inner tapering portion having a beveled outer side and a straight inner side. The outer thicker portion of the link, is not engaged by the pulley and constitutes a reinforcement which is of particular advantage when the link is worn down, while it moreover permits the seating of the screw 3, at a point beyond the reach of the pulley flange. The straight inner side of the inner link portion lies flat against the corresponding outer side of link 2 so as to permit free motion therebetween, while the beveled outer side of the inner link portion parallels substantially the inner slope of the pulley flange.

It will be observed that in the finished link, the bevel on the outer side is obtained without removing any part of the grain side of the leather, so that the latter remains integral or continuous throughout the entire outer face of the link. The result is that the life of the link is greatly prolonged and that its grip on the pulley is increased to a desirable extent over links in which the grain is partly demolished in order to furnish the bevel.

I claim:

1. A drive chain comprising a series of outer leather links arranged in pairs, and interposed inner links pivotally connected to the outer links, the inner faces of the outer links being straight in cross section, while the outer faces of said links are partly straight and partly beveled in cross section, said outer faces being formed exclusively from the grain side of the leather.

2. A leather chain link having an inner face which is straight in cross section, and an outer face that is partly straight and partly beveled in cross section, the straight portion of the outer face paralleling the inner face, while the beveled portion of the outer face converges toward the inner face, said outer face being formed exclusively from the grain side of the leather.

3. A method of forming a chain link from leather having a grain side and a flesh side which consists in stamping out a blank from said leather, beveling the blank on the flesh side along one of its longitudinal edges, and then bending the blank, to straighten it out at said flesh side and thereby form a corresponding bevel on the grain side.

FREDERICK MESINGER.

Copies of this patent may be obtained for five cents each, by addressing the "Commissioner of Patents, Washington, D. C."